(12) United States Patent
Wang et al.

(10) Patent No.: US 12,681,728 B2
(45) Date of Patent: Jul. 14, 2026

(54) RESERVATION STATION DESIGN METHOD FOR VECTOR EXECUTION UNITS

(71) Applicant: Jiangsu Huachuang Microsystem Company Limited, Nanjing (CN)

(72) Inventors: Siming Wang, Nanjing (CN); Wenjun Han, Nanjing (CN)

(73) Assignee: Jiangsu Huachuang Microsystem Company Limited, Nanjing (CN)

( * ) Notice: Subject to any disclaimer, the term of this patent is extended or adjusted under 35 U.S.C. 154(b) by 53 days.

(21) Appl. No.: 19/010,244

(22) Filed: Jan. 6, 2025

(65) Prior Publication Data

US 2025/0251936 A1      Aug. 7, 2025

(30) Foreign Application Priority Data

Feb. 1, 2024    (CN) .......................... 202410143007.2

(51) Int. Cl.
    *G06F 9/38*        (2018.01)
    *G06F 9/30*        (2018.01)
(52) U.S. Cl.
    CPC ........ *G06F 9/3013* (2013.01); *G06F 9/30036* (2013.01)
(58) Field of Classification Search
    None
    See application file for complete search history.

(56) References Cited

U.S. PATENT DOCUMENTS

| | | | |
|---|---|---|---|
| 6,535,972 B1 * | 3/2003 | Mahurin ................. | G06F 9/384 |
| | | | 712/228 |
| 2006/0149941 A1 * | 7/2006 | Colavin .................. | G06F 9/381 |
| | | | 712/229 |
| 2016/0092223 A1 * | 3/2016 | Wang .................. | G06F 12/0875 |
| | | | 712/208 |
| 2022/0067154 A1 * | 3/2022 | Favor .................... | G06F 21/556 |

* cited by examiner

*Primary Examiner* — Michael Sun
(74) *Attorney, Agent, or Firm* — Bayramoglu Law Offices LLC

(57)                ABSTRACT

A reservation station design method for vector execution units includes: S1, receiving an instruction by a reservation station, decoding the number of ticks for executing the instruction, and extracting an address of each source operand; S2, determining whether each source operand is ready; selecting a specific instruction slot to store the instruction, monitoring a bypass path, and pulling up a status bit of each not-ready source operand; S3, sorting non-transmitted instructions, determining a specific instruction according to a sorting result, and transmitting the specific instruction to a vector execution unit, and sending out a prewrite-back signal; and S4, setting hold signals, and blocking an instruction to be blocked; and when the address of each source operand corresponding to any one non-transmitted instruction is identical with an address in the prewrite-back signal, counting ticks, and in the last tick, transmitting a corresponding non-transmitted instruction to the vector execution unit for execution.

7 Claims, 5 Drawing Sheets

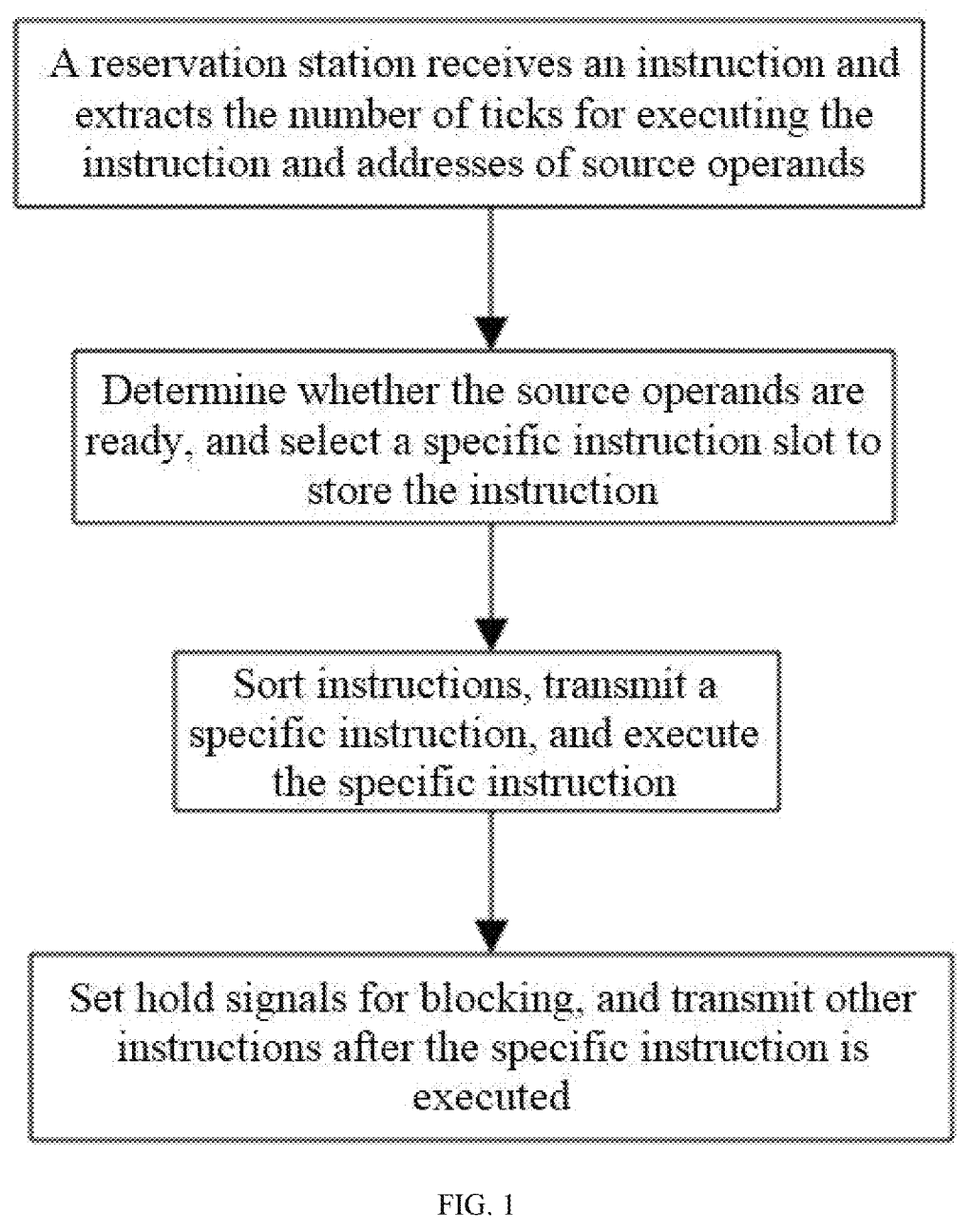

A reservation station receives an instruction and extracts the number of ticks for executing the instruction and addresses of source operands Determine whether the source operands are ready, and select a specific instruction slot to store the instruction Sort instructions, transmit a specific instruction, and execute the specific instruction Set hold signals for blocking, and transmit other instructions after the specific instruction is executed

FIG. 1

RESERVATION STATION DESIGN METHOD FOR VECTOR EXECUTION UNITS

CROSS REFERENCE TO THE RELATED APPLICATIONS

This application is based upon and claims priority to Chinese Patent Application No. 202410143007.2, filed on Feb. 1, 2024, the entire contents of which are incorporated herein by reference.

TECHNICAL FIELD

The invention relates to the field of processor design, in particular to a reservation station design method for vector execution units.

BACKGROUND

Vector operations, especially matrix operations, are widely used in the fields of machine leaning, mode recognition, image processing and graphic calculation. Particularly, deep learning algorithms that are developed in recent years have high recognition accuracy and good parallelism, thus receiving ever more attention.

A vector instruction allows for synchronous reading and writing of one or more pieces of data in the instruction, write-back of the vector instruction is a process of writing an execution result of the instruction back into a general purpose register file, and this is also the last stage of an instruction pipeline. A reservation station, an execution unit, multiple registers and other modules will be used in the vector instruction pipeline. A traditional reservation station transmits an instruction in each tick, and then the instruction is executed in the execution unit. However, as shown in FIG. 5, some instructions are executed for one tick while some instructions are executed for two ticks, and there is only one register write port, so when calculation results of two instructions are obtained at the same time, only the result of one instruction can be written into the register file, the result of the other instruction has to be stored externally and will not be written back until the write port is free, and a write conflict is generated in this case; and because the result of the other instruction has to be stored externally and wait, extra register resources are consumed.

SUMMARY

The technical issue to be settled by the invention is how to solve the problem of write conflicts of existing reservation stations and reduce desired register resources.

To settle the above technical issue, the invention provides a reservation station design method for vector execution units, which is implemented by the following technical solution:

A reservation station design method for vector execution units, wherein a dpu module, a reservation station, a register file and a vector execution unit which are connected in sequence and a bypass path connected to the reservation station are configured, the reservation station includes multiple instruction slots, and the register file includes multiple registers;

the reservation station design method for vector execution units includes the following steps:

S1, in any one tick of the reservation station, receiving, by the reservation station, an instruction dispatched from the dpu module and getting ready configuration parameters, decoding the number of ticks for executing the instruction, and extracting an address of each source operand of the instruction;

S2, determining each source operand according to the address of each source operand extracted in S1, determining whether each source operand is ready, and pulling up a status bit of each ready source operand;

selecting a specific instruction slot from the multiple instruction slots to store the instruction, monitoring the bypass path, and when it is detected that the address of each not-ready source operand is hit by an address in written-back data, pulling up a status bit of each not-ready source operand;

S3, sorting all non-transmitted instructions in the multiple instruction slots in S2 according to a sequence in which the instructions enter the reservation station, and determining whether there is an instruction that is not blocked in the non-transmitted instructions; if there is no instruction that is not blocked in the non-transmitted instructions, not transmitting any instruction; if there is an instruction that is not blocked in the non-transmitted instructions, determining a specific instruction that enters the reservation station at the earliest and is not blocked according to a sorting result, transmitting the specific instruction to the vector execution unit for execution, and sending out a prewrite-back signal; and S4, setting a group of hold signals, detecting each non-transmitted instruction in the multiple instruction slots in S3 by means of the hold signals, determining each instruction to be blocked and each instruction not to be blocked, and blocking each instruction to be blocked;

getting ready configuration parameters corresponding to each non-transmitted instruction, and pulling up a status bit of each source operand corresponding to each non-transmitted instruction; and when the address of each source operand corresponding to any one non-transmitted instruction is identical with an address in the prewrite-back signal in S3, counting ticks, and in the last tick, transmitting a corresponding non-transmitted instruction to the vector execution unit for execution.

The number of ticks for executing an instruction is acquired in the reservation station, and block positions are set according to the number of ticks for executing the instruction, such that a write conflict is avoided; each source operand is pulled up to get the status bit ready, and a specific instruction slot is selected to store the instruction, such that effective transmission of the instruction and operating efficiency are guaranteed; in addition, a division signal that can be executed in variable ticks is adopted as a hold signal, such that a transmitted instruction can be selected effectively and a write conflict is further avoided, thus reducing the consumption of write ports of registers.

Preferably, in S1, the instruction dispatched from the dpu module has a serial number of a branch prediction block, and whether pipeline flushing is needed for the instruction is determined according to the serial number of the branch prediction block. Whether pipeline flushing is needed is determined by means of the serial number of a branch prediction block, such that the operating efficiency in the whole process is improved, the performance and functionality are improved, and resource consumption is reduced.

Preferably, in S1, one or at least two reservation stations are configured, and the number of the reservation stations is the same as the number of the vector execution units. In case of more than one reservation station, each reservation station is connected to a vector execution unit to reduce interactions between the reservation stations and guarantee the synchronous operating efficiency of multiple reservation stations, such that write conflicts of the multiple reservation stations can be effectively avoided.

Preferably, in S2, a method for determining whether each source operand is ready includes: detecting whether each source operand has been written back into the register file, determining each source operand that has been written back into the register file as ready, and determining each source operand that has not been written back into the register file as not-ready. Whether source operands are ready can be quickly and easily determined by means of data written back into the register file.

Preferably, in S2, a method for selecting a specific instruction slot from the multiple instruction slots to store the instruction includes the following steps: determining whether an instruction slot, where an instruction in a previous tick is stored, has a vacant position; if so, storing the instruction in S2 in the vacant position of the instruction slot where the instruction in the previous tick is stored; if not, determining whether other instruction slots other than the instruction slot, where the instruction in the previous tick is stored, has a vacant position; if other instruction slots have a vacant position, selecting one instruction slot with a vacant position to store the instruction in S2; if other instruction slots do not have a vacant position, storing the instruction in S2 in an instruction slot that transmits an instruction in the previous tick. Each instruction is placed in a specific instruction slot, and instruction slots with vacant positions are fully used, such that the complexity of a control circuit can be effectively reduced, and an excessively large control circuit is avoided.

Preferably, in S2, the status bit is pulled up by a positive logic, "1" indicates a high position, and "0" indicates a low position. The positive logic can effectively pull up the status bit and has high compatibility and intuitivity, such that misunderstanding and aliasing in design and communication are reduced.

Preferably, in S4, the group of hold signals includes a write conflict block signal, a division block signal and a write-back bubble block signal, and the division block signal is written back by means of the write-back bubble block signal; and in a case where a division block or a write conflict block is detected when the multiple instruction slots are detected by means of the hold signals, transmission of an instruction corresponding to the division block or the write conflict block will be stopped. The write conflict block signal can effectively detect an instruction with a write conflict block, the division block signal can effectively detect an instruction with a division block, and the block signal requesting write-back bubbles can effectively write back a division instruction to ensure that the division instruction can be written back normally; and when a block is detected, instruction transmission is stopped to avoid a write conflict.

Compared with the prior art, the invention has the following beneficial effects:

In the invention, the reservation station acquires the number of ticks for executing an instruction, and block positions for the instruction and other instructions are determined according to the number of ticks for executing the instruction, such that the likelihood of a write conflict between the instruction and other instructions is reduced; a specific instruction slot is selected to store the instruction, such that instruction slot resources are effectively used, and resource consumption is reduced; in addition, hold signals are used, a division signal that can be executed in variable ticks is used, and by means of the characteristics of variable-tick execution, the problem of write conflicts is solved, and the consumption of register resources is reduced.

BRIEF DESCRIPTION OF THE DRAWINGS

FIG. 1 is a flow diagram of a reservation station design method for vector execution units;

DETAILED DESCRIPTION OF THE EMBODIMENTS

The technical solutions in some embodiments of the invention are described in detail below in conjunction with drawings of these embodiments.

Embodiment 1

Figure 2:
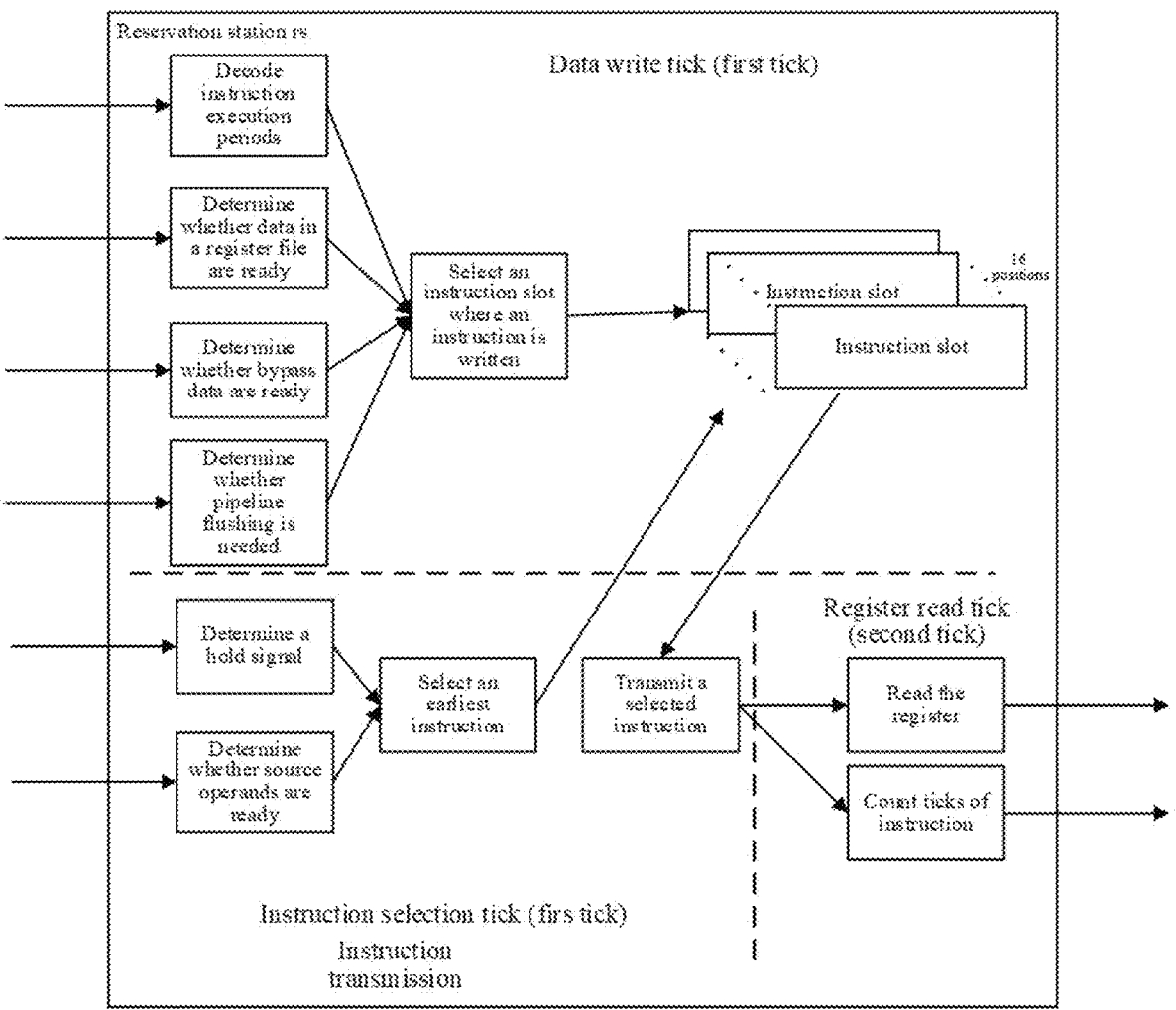
FIG. 2 is a schematic structural diagram of a reservation station for a vector execution unit in operation.

As shown in FIG. 1 which is a flow diagram of a reservation station design method for vector execution units and FIG. 2 which is a schematic structural diagram of a reservation station for a vector execution unit in operation, a dpu module, a reservation station, a register file and a vector execution unit which are connected in sequence and a bypass path connected to the reservation station are configured, and the reservation station includes multiple instruction slots. The dpu module is an instruction dispatch unit and configured to dispatch instructions to the reservation station. The reservation station is a hardware structure and configured to receive and transmit the instructions dispatched from the dpu module, and the reservation station works together with an instruction pipeline to manage instruction execution sequences and resource allocation. The register file is a storage structure formed by multiple registers and configured to store data, the register file includes control and status registers (csrs), vector registers, floating-point registers, fixed-point registers and v0 general purpose registers, wherein the number of each type of registers may be one, and when mass data need to be processed, the number of each type of registers may be increased to satisfy requirements. The vector execution unit is a unit special for performing vector operations. The bypass path includes a group of path signals; in a case where one reservation station is configured, the path signals are written back from the execution unit; and in a case where at least two reservation stations are configured, the path signals may be written back from the execution unit or from other reservation stations.

The reservation station design method for vector execution units includes the following steps:

S1, in any tick of the reservation station, the reservation station receives data from the register file and gets ready configuration parameters and an instruction dispatched from the dpu module, and the number of ticks for executing the instruction and an address of each source operand of the instruction are decoded. The configuration parameters are parameters for customizing behaviors of instructions and characterizes the behaviors and functions of the instructions, and one tick refers to one clock period. In one tick, the reservation station will receive configuration parameters transmitted from the csr and an instruction dispatched from the dpu module; after receiving the configuration parameters and the instruction, the number of ticks for executing the instruction can be decoded, and the address of each source operand of the instruction is extracted. The instruction generally has multiple source operands, and each source operand has a corresponding address and a corresponding status bit.

In this embodiment, the instruction received by the reservation station is formed by multiple microoperations, and each microoperation corresponds to one or more source operands. After the reservation station receives the instruction, each microoperation needs to be executed, and all the source operands may be used or only part of the source operands may be used. For example, each instruction received by the reservation station has five source operands; an instruction A uses three source operands of its own, and the other two source operands of the instruction A are invalid; and an instruction B uses the five source operands of its own.

In addition, in a case where part of the source operands is not used, the status bits of these source operands that are not used are directly pulled up to avoid an influence on instruction transmission, such that processing efficiency is guaranteed.

In this embodiment, the instruction dispatched from the dpu module also has a serial number of a branch prediction block, wherein the serial number of the branch prediction block is a natural number from 1 to n, each serial number corresponds to one instruction, the specific value of n is determined according to the requirement for performance in actual design. The greater the value of n, the better the performance, and the more complex the function; and the smaller the value of n, the poorer the performance, and the simpler the function. Whether pipeline flushing is needed for the instruction can be determined according to the serial number of the branch prediction block. By pipeline flushing, instructions that are mistakenly fetched in case of an erroneous branch prediction can be eliminated from the reservation station to guarantee the accuracy of instruction execution.

Because the instruction execution sequence in a pipeline may be interrupted in the whole processing process if the instruction is a branch instruction, it is necessary to wait for a conditional determination result of the branch instruction. To reduce such interrupts of the pipeline to guarantee processing efficiency and accuracy, the instruction pipeline flushing technique is used to predict an execution result of a branch instruction, and according to the predicted result, instructions in the pipeline continue to be performed according to a corrected instruction path, or an erroneous instruction path in the pipeline will be abandoned, and other instructions are executed. An efficient branch prediction technique can minimize the interrupts of the pipeline to improve instruction execution efficiency. For example, the serial numbers of branch prediction blocks are natural numbers from 1-16, one of 16 status bits is transmitted to the reservation station in each tick, each status bit represents one branch prediction block, each branch prediction block corresponds to one group of instructions, and if the first bit is pulled up, instructions corresponding to the branch prediction block 1 will be eliminated from the pipeline. When it is recognized that pipeline flushing is needed for instructions corresponding to one branch prediction block, significant bits of corresponding instruction slots in the reservation station are pulled down. When the significant bits of the instruction slots are pulled down, the instruction slots are emptied, indicating that corresponding instructions are flushed away from the reservation station.

It should be noted that the status bit of the branch prediction block for branch prediction and the status bit of the source operands correspond to completely different signals and functions, and they are identical merely in expression. The status bit of the branch prediction block is provided from the outside and used for flushing instructions away from the reservation station, and the status bit of the source operands is pulled up in the reservation station and used for determining whether data are ready, and the instruction will not be transmitted until all data are ready.

In this embodiment, in S1, one or at least two reservation stations are configured, and the number of the reservation stations is the same as the number of the vector execution units. In a case where multiple reservation stations are configured, if the multiple reservation stations share one vector execution unit, the number of the vector execution units is reduced and resource scheduling is realized to some extent, but resource competition between the reservation stations will be caused inevitably, particularly in a case where instructions processed by different reservation stations are associated, instruction conflicts between different reservation stations may be caused, and the operating pressure of the vector execution unit shared by different reservation stations will be increased. In view of this, the number of the reservation stations is set to be the same as the number of the vector execution units to guarantee correct operation of each reservation station and overall operating efficiency.

S2, each source operand of the instruction is determined according to the address of each source operand in S1, and whether each source operand is ready is determined according to whether each source operand has been written back into the register file; if each source operand has been written back into the register file, it indicates that each source operand is ready, and the status bit of each ready source operand is pulled out; or, if there is still a source operand that has not been written back into the register file, it indicates that the source operand is not ready.

After whether each source operand is ready is determined, a specific instruction slot is selected from the multiple instruction slots to store the instruction, and then, not-ready operands should be transformed into a ready status. For each source operand that has not been written back into the register file, a signal in the bypass path needs to be monitored, and when it is detected that any one not-ready source operand is hit by written-back data in the signal, the status bit of this operand is pulled up.

It should be noted that a pull-up operation of a source operand refers to pulling up the corresponding status bit of the source operand, and this indicates that the source operand is ready. When the source operand is ready, the address of the source operand matches a written-back address. After all source operands are ready, it indicates that the corresponding instruction can be transmitted, and the instruction, if not blocked, will be transmitted to the vector execution unit to be executed.

In this embodiment, the status bit is pulled up by a positive logic, wherein "1" indicates a high position, and "0" indicates a low position. Before the status bit of the data is pulled up, a flag corresponding to the data is 0, indicating that the data are not ready; and when the status bit is pulled up, the flag turns into 1, indicating that the data are ready. Compared with a negative logic or other logics, the positive logic can be understood more easily, misunderstanding and aliasing in design and communication are reduced, and compatibility and intuitivity are better.

In this embodiment, bypass monitoring refers to monitoring the corresponding fixed-point register, floating-point register, vector register and v0 general purpose register in the register file, and corresponding data in these registers are compared with the addresses of source operands that are not pulled up, and every time a matching source operand is found, the source operand will be pulled up.

In this embodiment, in S2, when a specific instruction slot is selected from the multiple instruction slots to store the instruction, there are the following two cases: in a case where an instruction slot in a previous tick of the reservation station has a vacant position, the instruction in S2 is placed in the vacant position of the instruction slot in the previous tick of the reservation station; in a case where the instruction slot in the previous tick of the reservation station does not have a vacant position, the instruction in S2 is placed in an instruction slot that transmits an instruction in the previous tick. Each instruction slot has multiple positions, and each position can store one instruction, corresponding configuration parameters and other information. For any one instruction slot, vacant positions in one row of the instruction slot will be used in one tick, the number of bits of data is fixed, and if some of these data are invalid, default values transmitted from the previous stage will fill in remaining positions of the instruction slot because the invalid data will not be used and will not exert an influence on the result. Dynamic selection of vacant positions for storing data will lead to a huge and complex instruction selection and control circuit, is extremely complicated, and cannot be implemented. In a case where one instruction slot does not have a vacant position, the instruction in this tick will be stored in another instruction slot with a vacant position. If none of the multiple instruction slots has a vacant position, the instruction and related data in this tick can be stored in an instruction slot that transmits an instruction in the previous tick, and the instruction and related data in the previous tick are eliminated to satisfy the demand in this tick.

In this embodiment, when the specific instruction slot is selected in S2, the multiple instruction slots may be sorted, and the first instruction slot is used in the first tick; in the second tick, if the first instruction slot still has a vacant position, the first instruction slot will be used; if the first instruction slot does not have a vacant position, the second instruction slot will be used; in the third tick, the specific instruction slot is selected in the same way until all the ticks are completed or all the instruction slots are used. In one tick, if none of the instruction slots has a vacant position and an instruction is transmitted in the previous tick, the instruction in this tick can be stored in the position of the instruction transmitted in the previous tick.

S3, non-transmitted instructions in the multiple instruction slots in S2 are sorted according to a sequence in which the instructions enter the reservation station to recognize an earliest instruction, a second earliest instruction, etc. Whether there is an instruction that is not blocked in the non-transmitted instructions is determined; if there is not an instruction that is not blocked in the non-transmitted instructions, it indicates all the instructions are blocked, no instruction will be transmitted, and a block is set by a hold signal set in a tick before the current tick; if there is an instruction that is not blocked in the non-transmitted instructions, a specific instruction that enters the reservation station at the earliest and is not blocked is determined from the earliest instruction according to a sorting result, the specific instruction is transmitted to the vector execution unit to be executed, and a prewrite-back signal is sent out.

In this embodiment, when one instruction is transmitted from the instruction slot to the execution unit, an address to which the instruction will be written back and the number of ticks for executing the instruction will be transmitted to the reservation station, and the address and number of ticks transmitted to the reservation station are both prewrite-back signals. In case of multiple reservation stations, addresses transmitted to other reservation stations when instructions are transmitted are also prewrite-back signals.

S4, hold signals are set, wherein the hold signals include a write conflict block signal, a division block signal and a write-back bubble block signal, each signal corresponds to one signal instruction, and the write-back bubble block signal is also referred to as a block signal requesting write-back bubbles. The write conflict block signal generates a block signal by means of the shift register to block an instruction that may cause a write conflict, the division block signal also generates a block signal by means of the shift register, and the block signal generated by the division block signal is combined with the block signal generated by the write conflict block signal to block the transmission of the instruction. All instructions stored in the instruction slots are detected by means of the three hold signals to distinguish instructions to be blocked from instructions not to be blocked, instructions that may cause a write conflict and a division conflict are blocked, and a block position is set according to the number of ticks; and before the block position, the blocked instruction will not be transmitted. The division block signal adopts a division instruction, and when the division instruction is executed, it takes some time to complete the operation, so the write-back bubble block signal is used to stop other operations; after the division instruction is executed and the block position is set, the division instruction will write a result back to the register file; in this process, the processor will generate bubbles, that is to say, some vacant periods will be introduced to the pipeline of the processor to ensure that the division result can be written back correctly.

It should be noted that the bubbles of the processor are vacant periods introduced into the pipeline of the processor to ensure that instructions or operations can be performed smoothly.

In this embodiment, "prewrite-back" is an operation of sending, before the calculation result of an instruction is about to be, but not have been, written back to the register file, a corresponding control signal to the reservation station to allow the instruction to get data ready in advance to improve execution efficiency.

Because the division instruction can be executed in variable ticks, the number of ticks written back is not fixed. The specific write-back logic is as follows: when an operation corresponding to the division instruction is completed, the division instruction is stored in an internal register, a prewrite-back signal will be provided in a tick before the calculation result of the division instruction is obtained, and the prewrite-back signal is sent to the reservation station; when receiving the prewrite-back signal, the reservation station will find a vacant position in the shift register for solving write conflicts, the vacant position is pulled up to prevent the instruction from being transmitted, and at the same time, the block position is marked and sent to a multi-tick execution unit; and when a multi-tick instruction finds the marked position, it will write back the division result. When a fixed-point division instruction and a floating-point division instruction generate both prewrite-back requests, the reservation station will find two vacant positions in the shift register, and the division results are sequentially written back to the vacant positions.

The operation of the division block signal is an operation based on a module that is used cyclically rather than a pipelined operation, so a new division instruction cannot be transmitted in the operation of the division block signal. In addition, all instruction slots with instructions need to be detected in each tick; if a fixed-point division block or a floating-point division block is detected, it indicates that a conflict occurs, and the corresponding instruction cannot be transmitted. By means of the division block signal, transmission of the instruction in the current tick can be stopped in time when necessary to avoid a conflict.

In this embodiment, in S4, in a case where a fixed-point division block or a floating-point division block is detected when the multiple instruction slots are detected by means of the hold signals, transmission of the instruction will be stopped instantly to avoid a write conflict between two instructions; when a write conflict block is detected, the instruction will also be blocked; and when a block signal requesting write-back bubbles is detected, a prewrite-back request will be sent to the reservation station when the operation of a division instruction corresponding to the division block signal is about to be completed, to send a flag to be written back to the vector execution unit to perform write-back.

Figure 4:
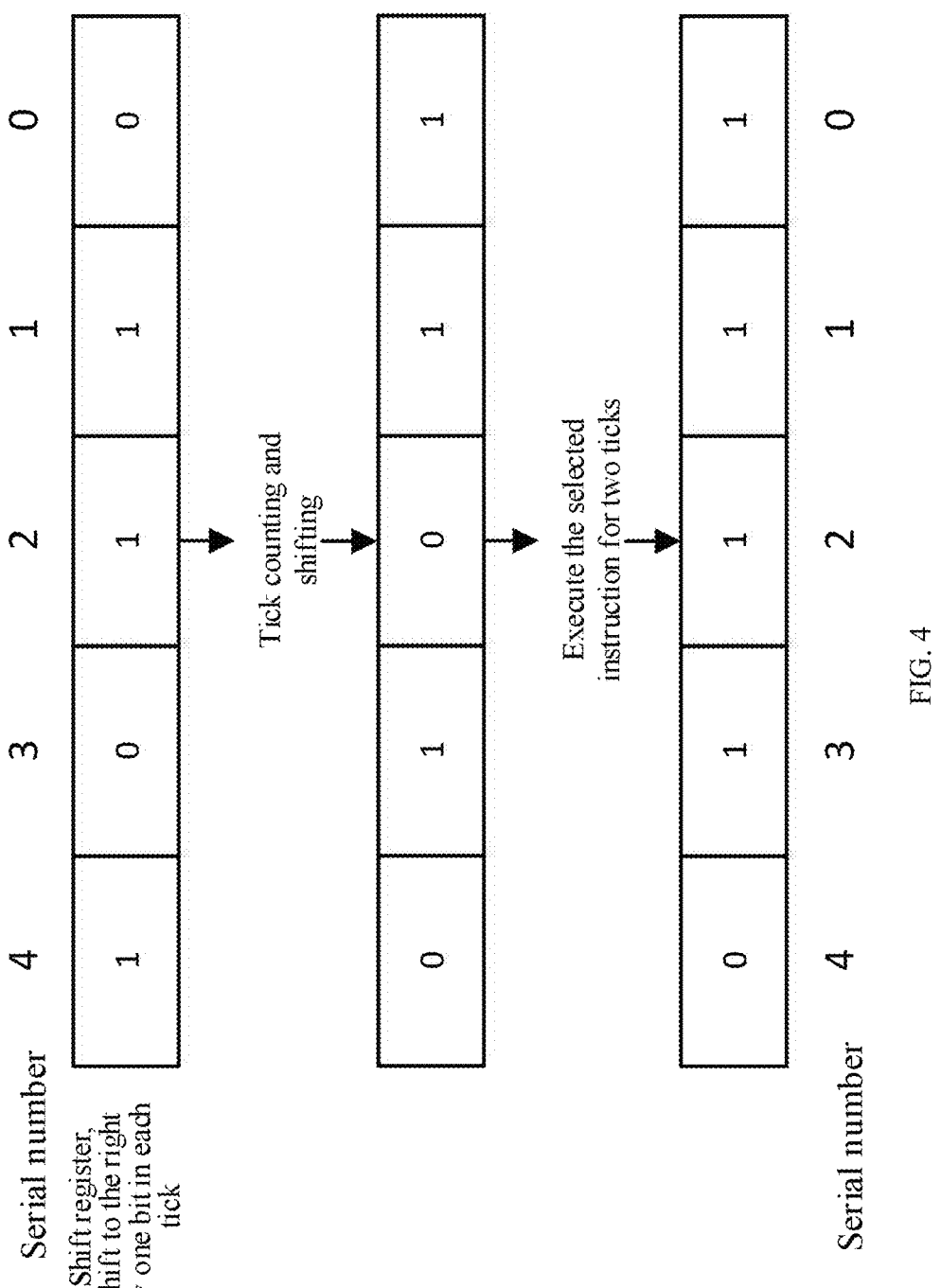
FIG. 4 is a principle diagram of a shift operation performed by a shift register to solve a write conflict.
Figure 5:
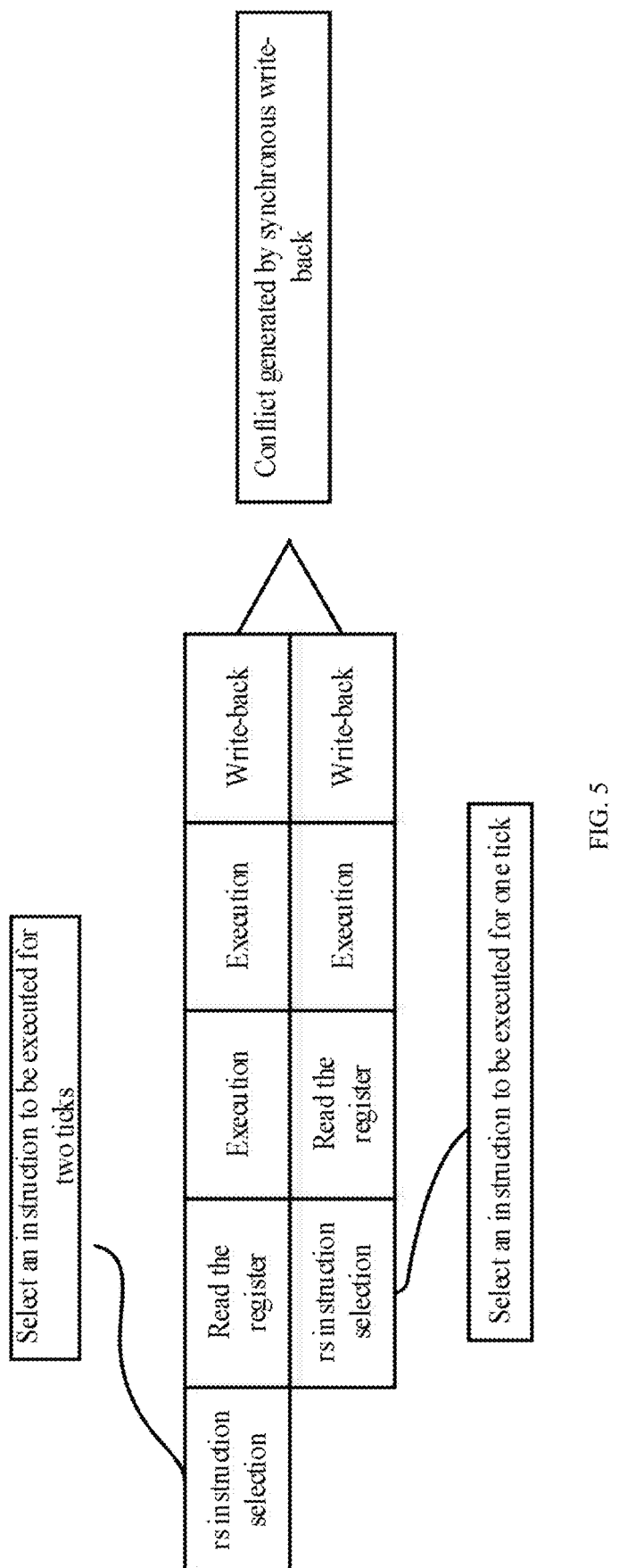
FIG. 5 is a principle diagram of a write conflict between instructions in a reservation station.

As shown in FIG. 4 which is a principle diagram of a shift operation performed by the shift register to solve a write conflict. Bits corresponding the instruction in the shift register are 10110, it is set by the write conflict block signal that one shift to the right by one bit is performed in each tick, and then tick counting and shifting are performed, that is, the bits turn into 01011 after the shift in one tick; and the selected instruction needs to be executed for two ticks, the least significant digit of the shift register indicates that there is an instruction that needs to be written back instantly, and the serial number is 0. The instruction needs to be executed for two ticks, which means that the instruction will be written back two ticks later, and the position corresponding to the serial number 2 should be pulled up, so the bits corresponding the instruction in the shift register are finally 01111.

Figure 3:
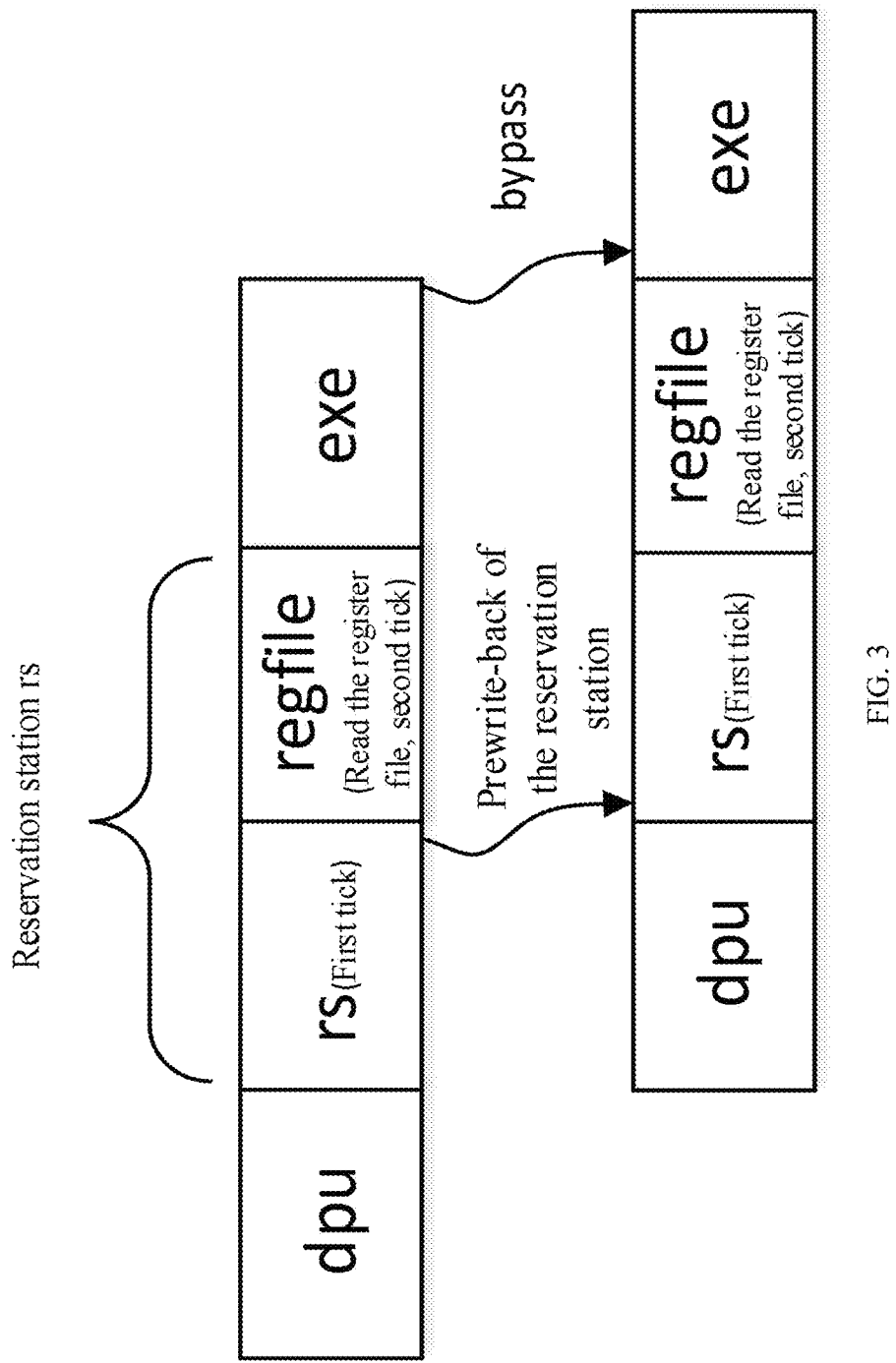
FIG. 3 is a schematic diagram of data transmission between a vector execution unit and a reservation station in two ticks.

As shown in FIG. 3 illustrates data transmission between two ticks of the reservation station, in the first tick, an instruction dispatched by the dqu is received, and then the instruction is saved in the rs; if data are ready and the instruction can be transmitted, a source operand is read from the register file in the next tick; and the instruction is executed by exe in the third tick. When transmitting an instruction, the reservation station will transmit a destination address where the instruction is transmitted to itself, and the destination address corresponds to the prewrite-back signal in FIG. 3 and used for determining whether data of other instructions in the next tick are ready. A result written back by exe will be directly input to exe and used as a source operand of an instruction in the next tick, corresponding to bypass in FIG. 3.

Specific Application Example:

A dpu module, two reservation stations rs1 and rs2 connected by a bypass path, register files, and vector execution units exe0 and exel are configured. The reservation station has multiple instruction slots, the bypass path is connected to the outside of the two reservation stations and is also connected to the register files of the two register files. The register file includes multiple shift registers, multiple csrs, multiple vector registers, multiple floating-point registers, multiple fixed-point registers and multiple v0 general purpose registers.

In each tick, the dpu module sends an instruction to the reservation station, and each instruction has five source operands.

In any one tick, the reservation station extracts the number of ticks for executing the instruction (the number of ticks for executing the instruction is 1) and the number of operands of the instruction (the number of operands of the instruction is 5) and extracts corresponding configuration parameters from the csrs; the reservation station reads the five operands, three of the five source operands are valid source operands to be executed, and status bits of the other two invalid source operands are directly pulled up, addresses of the three valid source operands are compared with address information in the register file, and it is detected the addresses of two valid source operands match with the address information in the register file, so status bits of the two source operands are directly pulled up.

Each instruction slot in the reservation station is detected, wherein instruction slots 1-3 have been full of instructions, instruction slot 4 is used, but it still has a vacant position, three are two non-transmitted instructions, and instruction slot 5 and instruction slots behind the instruction slot 5 are all vacant, so the instruction 4 is selected as a specific instruction slot, and information of the five source operands of the instruction is stored in instruction slot 4. Data in the fixed-point registers, the floating-point registers, the vector registers and the v0 general purpose registers in the bypass path are monitored; if it is detected that address data in the vector registers match the remaining source operand, the status bit of the remaining source operand is pulled up, and at this moment, the five source operands are ready.

Two non-transmitted instructions are found when the instruction slots of the reservation station are detected, three instructions in total together with the instruction in the current tick; the two non-transmitted instructions are instructions that are blocked in previous ticks, and according to the sequence in which the instructions enter the reservation station, the three instructions are respectively taken as an earliest instruction, a second earliest instruction and a current instruction. Whether the earliest instruction is still blocked is detected first, and it is detected that the earliest instruction is still blocked and needs to be blocked for three ticks; then, the second earliest instruction is detected, and it is detected that the second earliest instruction is no longer blocked in this tick, so the second earliest instruction is transmitted to the vector execution unit to be executed; and the number of ticks for executing the instruction tick is 2 and is written back to the reservation station together with address information of the instruction.

Hold signals are set, wherein the hold signals include a write conflict block signal, a division block signal and a write-back bubble block signal. When the hold signals detect the earliest instruction and the current instruction, an operation corresponding to the division signal is started, and the write-back bubble block signal provides a prewrite-back signal in a tick before an operation result of the division block signal is obtained and sends the prewrite-back signal to the reservations station; when receiving the prewrite-back signal, the reservation station finds a vacant position in the shift register and pulls up the vacant position, positions where the two instructions need to be blocked are marked, and the two marked positions are sent to the vector execution unit; and when receiving the marked positions, the vector execution units writes back a result. The write conflict block signal also sets block positions for the earliest instruction and the current instruction according to the number of ticks for executing the instructions.

In the three ticks for executing the second earliest instruction, the reservation station will receive three instructions, and the three instructions are stored in the instruction slots and sorted, and block positions are set in the same way.

Finally, after the second earliest instruction is executed, the earliest instruction will no longer be blocked, a write-back address of the second earliest instruction hits the address of the source operand of the earliest instruction, such that the earliest instruction is transmitted to the vector execution unit to be executed.

In the invention, the reservation station acquires the number of ticks for executing an instruction, and block positions for the instruction and other instructions are determined according to the number of ticks for executing the instruction, such that the likelihood of a write conflict between the instruction and other instructions is reduced; a specific instruction slot is selected to store the instruction, such that instruction slot resources are effectively used, and resource consumption is reduced; in addition, hold signals are used, a division signal that can be executed in variable ticks is used, and by means of the characteristics of variable-tick execution, the problem of write conflicts is solved, and the consumption of register resources is reduced.

Terminology Explanation:

(1) dpu: dispatch unit used as a buffer for instructions in previous stages.

(2) crs: control and status register used for storing control and status information of a processor (3) rs: reservation station used for saving the status of instructions in the execution process of the instructions to allow for reacquisition and further execution of these instructions if necessary.

(4) Write-back: write data of an operation unit back to registers.

(5) bypass: physically connect two systems by means of a specific trigger status.

(6) Register file: the register file is an array formed by multiple registers in a CPU and is generally implemented by quick static-status random read write memories.

(7) source operand of instruction: the source operand is data acquired by the instruction from a certain place as an operand; in the instruction execution process, the source operand is generally data acquired from a register or data written back by an execution unit and is used as an input to perform an operation in the instruction. The source operand is data acquired from a storage unit or data structure and is used as input to be provided to the instruction to perform a corresponding operation.

The above embodiments are merely used for explaining the technical concept of the invention and are not intended to limit the protection scope of the invention. Any modifications made based on the technical concept of the invention should also fall within the protection scope of the invention.

What is claimed is:

1. A reservation station design method for vector execution units, wherein a dpu module, a reservation station, a register file and a vector execution unit are connected in sequence, a bypass path is connected to the reservation station, the reservation station comprises a plurality of instruction slots, and the register file comprises a plurality of registers;

the reservation station design method comprises the following steps:

S1, in any one tick of the reservation station, receiving, by the reservation station, an instruction dispatched from the dpu module and getting ready configuration parameters, decoding a number of ticks for executing the instruction, and extracting an address of each source operand of the instruction;

S2, determining each source operand according to the address of each source operand extracted in S1, determining whether each source operand is ready, and pulling up a status bit of each ready source operand; selecting a specific instruction slot from the plurality of instruction slots to store the instruction, monitoring the bypass path, and when it is detected that an address of each not-ready source operand is hit by an address in written-back data, pulling up a status bit of each not-ready source operand;

S3, sorting all non-transmitted instructions in the plurality of instruction slots in S2 according to a sequence in which the instructions enter the reservation station, and determining whether there is an instruction that is not blocked in the non-transmitted instructions; when there is no instruction that is not blocked in the non-transmitted instructions, not transmitting any instruction; when there is an instruction that is not blocked in the non-transmitted instructions, determining a specific instruction that enters the reservation station at the earliest and is not blocked according to a sorting result, transmitting the specific instruction to the vector execution unit for execution, and sending out a prewrite-back signal; and S4, setting a group of hold signals, detecting each non-transmitted instruction in the plurality of instruction slots in S3 by the group of hold signals, determining each instruction to be blocked and each instruction not to be blocked, and blocking each instruction to be blocked;

getting ready configuration parameters corresponding to each non-transmitted instruction, and pulling up a status bit of each source operand corresponding to each non-transmitted instruction; and when the address of each source operand corresponding to any one non-transmitted instruction is identical with an address in the prewrite-back signal in S3, counting ticks, and in a last tick, transmitting a corresponding non-transmitted instruction to the vector execution unit for execution.

2. The reservation station design method according to claim 1, wherein in S1, the instruction dispatched from the dpu module has a serial number of a branch prediction block, and whether pipeline flushing is needed for the instruction is determined according to the serial number of the branch prediction block.

3. The reservation station design method according to claim 1, wherein in S1, one or at least two reservation stations are configured, and a number of the one or at least two reservation stations is same as a number of vector execution units.

4. The reservation station design method according to claim 1, wherein in S2, a method for determining whether each source operand is ready comprises: detecting whether each source operand has been written back into the register file, determining each source operand that has been written back into the register file as ready, and determining each source operand that has not been written back into the register file as not-ready.

5. The reservation station design method according to claim 1, wherein in S2, a method for selecting the specific instruction slot from the plurality of instruction slots to store the instruction comprises:

determining whether an instruction slot, where an instruction in a previous tick is stored, has a vacant position; when the instruction slot, where the instruction in the previous tick is stored, has the vacant position, storing the instruction in S2 in the vacant position of the instruction slot where the instruction in the previous tick is stored; when the instruction slot, where the instruction in the previous tick is stored, does not have the vacant position, determining whether other instruction slots other than the instruction slot, where the instruction in the previous tick is stored, has the vacant position;

when other instruction slots have the vacant position, selecting one instruction slot with the vacant position to store the instruction in S2; when other instruction slots do not have the vacant position, storing the instruction in S2 in an instruction slot that transmits an instruction in the previous tick.

6. The reservation station design method according to claim 1 wherein in S2, the status bit is pulled up by a positive logic, "1" indicates a high position, and "0" indicates a low position.

7. The reservation station design method according to claim 1, wherein in S4, the group of hold signals comprises a write conflict block signal, a division block signal and a write-back bubble block signal, and the division block signal is written back by the write-back bubble block signal; and in a case where a division block or a write conflict block is detected when the plurality of instruction slots are detected by the group of hold signals, transmission of an instruction corresponding to the division block or the write conflict block is stopped.

* * * * *